(12) United States Patent
Yang

(10) Patent No.: US 12,406,103 B2
(45) Date of Patent: Sep. 2, 2025

(54) ELECTRONIC DEVICE

(71) Applicant: QISDA CORPORATION, Taoyuan (TW)

(72) Inventor: Hsueh-Chun Yang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 287 days.

(21) Appl. No.: 18/104,304

(22) Filed: Feb. 1, 2023

(65) Prior Publication Data

US 2023/0306144 A1   Sep. 28, 2023

(30) Foreign Application Priority Data

Mar. 22, 2022   (CN) .......................... 202210286026.1

(51) Int. Cl.
| | |
|---|---|
| *G06F 21/86* | (2013.01) |
| *G06F 21/83* | (2013.01) |
| *G06F 3/045* | (2006.01) |
| *G06F 21/88* | (2013.01) |

(52) U.S. Cl.
CPC .............. *G06F 21/86* (2013.01); *G06F 21/83* (2013.01); *G06F 3/045* (2013.01); *G06F 21/88* (2013.01); *G06F 2200/1637* (2013.01); *G06F 2221/2143* (2013.01)

(58) Field of Classification Search
CPC .. G06F 21/86; G06F 21/88; G06F 2221/2143; G06F 3/045; G06F 2200/1637
See application file for complete search history.

(56) References Cited

U.S. PATENT DOCUMENTS

| | | | | |
|---|---|---|---|---|
| 4,811,288 | A  * | 3/1989 | Kleijne | ................ H01L 23/576 365/228 |
| 9,411,386 | B2 | 8/2016 | Sauerwein, Jr. | |
| 11,191,155 | B1 * | 11/2021 | Zhang | ...................... H05K 3/30 |
| 2018/0081400 | A1 * | 3/2018 | Pandya | .................. F16J 15/064 |
| 2019/0089724 | A1 * | 3/2019 | Norton | .................... G06F 1/189 |

\* cited by examiner

*Primary Examiner* — Ellen Tran

(57) ABSTRACT

An electronic device includes a body, a detachable element, a motherboard board and a deformable enclosure. The body includes a first surface and a second surface opposite to each other. The body is formed with a pressure channel. The pressure channel includes a first end and a second end. The pressure channel penetrates the first surface or the second surface. The detachable element covers the first end of the pressure channel. The motherboard is arranged on the body. A sensing element is arranged on the motherboard. The deformable enclosure closes the second end of the pressure channel. When the pressure channel is in a negative pressure state, the deformable enclosure exhibits a first deformation state and does not contact the sensing element. When the pressure channel is not in the negative pressure state, the deformable enclosure exhibits a second deformation state and contacts the sensing element.

14 Claims, 6 Drawing Sheets

ELECTRONIC DEVICE

FIELD OF THE INVENTION

The present invention relates to an electronic device, and more particularly to an electronic device capable of performing security protection on stored information by changing the negative pressure state.

BACKGROUND OF THE INVENTION

Generally, data processing equipment may store confidential data. For example, a credit card machine may stores confidential information such as payment of users. Therefore, data processing equipment should be designed to include security devices to detect tampering or unauthorized disassembly of the device. These security devices may be activated to access stored confidential data. When the data processing equipment is lost or stolen, if the thief cannot use the password or comply with other requirements to achieve normal access to the stored data, he or she may attempt to use other unconventional means to access the data, such as opening the casing.

In order to prevent the confidential data or personal information from being stolen, data processing equipment should be equipped with a security mechanism that immediately destroys the stored information once someone attempts to open the casing to access the data.

SUMMARY OF THE INVENTION

The invention provides an electronic device with a high-sensitivity security protection mechanism for accessing data.

The electronic device provided by the present invention includes a body, a detachable element, a motherboard board and a deformable enclosure. The body includes a first surface and a second surface opposite to each other. The body is formed with a pressure channel. The pressure channel includes a first end and a second end. The pressure channel penetrates the first surface or the second surface. The detachable element covers the first end of the pressure channel. The motherboard is arranged on the body. A sensing element is arranged on the motherboard. The deformable enclosure closes the second end of the pressure channel. When the pressure channel is in a negative pressure state, the deformable enclosure exhibits a first deformation state, and the deformable enclosure does not contact the sensing element. When the pressure channel is not in the negative pressure state, the deformable enclosure exhibits a second deformation state, and the deformable enclosure contacts the sensing element.

In an embodiment of the present invention, the deformable enclosure is a metal sheet and includes a central area and a peripheral area. The central area corresponds to the at pressure channel.

In an embodiment of the present invention, the first deformation state of the deformable enclosure is that the central area is recessed in a direction toward the second end so as not to contact the at least one sensing element. The second deformation state of the deformable enclosure is that the central area is flat and contacts the at least one sensing element.

In an embodiment of the present invention, the pressure channel changes from being in the negative pressure state to not being in the negative pressure state when the detachable element is away from the pressure channel.

In an embodiment of the present invention, the detachable element is a touch pane.

In an embodiment of the present invention, the sensing element is a switching element or a detecting element.

In an embodiment of the present invention, the switching element is a metal element.

In an embodiment of the present invention, a security circuit is provided on the motherboard, and the security circuit is electrically connected to the sensing element.

In an embodiment of the present invention, the security circuit is in a connected state when the deformable enclosure contacts the sensing element.

The electronic device provided by the present invention includes a body, a motherboard and a deformable enclosure. The body includes a front casing and a rear casing. The front casing and the rear casing are suitable for being covered with each other. The rear casing is formed with a pressure channel. The pressure channel includes a first end and a second end. The first end of the pressure channel does not penetrate the rear casing and functions as a closed end. The motherboard is arranged between the front casing and the rear casing. A sensing element and a supporting member are arranged on the motherboard. The supporting member surrounds the sensing element. The deformable enclosure is fixed between the supporting member and the pressure channel. The deformable enclosure closes the second end of the pressure channel. When the pressure channel is in a negative pressure state, the deformable enclosure exhibits a first deformation state, and the deformable enclosure does not contact the sensing element. When the pressure channel is not in the negative pressure state, the deformable enclosure exhibits a second deformation state, and the deformable enclosure contacts the sensing element.

In an embodiment of the present invention, when the rear casing is separated from the front casing, the pressure channel changes from being in the negative pressure state to not being in the negative pressure state.

In an embodiment of the present invention, the deformable enclosure is a metal sheet and includes a central area and a peripheral area. The peripheral area is fixed to the supporting member. The central area corresponds to the pressure channel.

The electronic device provided by the present invention includes a body, a motherboard and at least one deformable enclosure. The body includes a front casing and a rear casing. The front casing and the rear casing are suitable for being covered with each other. The rear casing is formed with at least one pressure channel. The at least one pressure channel includes a first end and a second end, and the first end of the at least one pressure channel does not penetrate the rear casing and functions as a closed end. The motherboard is arranged between the front casing and the rear casing. At least one sensing element, a security circuit and at least one supporting member are arranged on the motherboard. The at least one supporting member surrounds the at least one sensing element. The security circuit is electrically connected to the at least one sensing element. The at least one deformable enclosure is fixed between the at least one supporting member and the at least one pressure channel. The at least one deformable enclosure closes the second end of the at least one pressure channel. The at least one deformable enclosure includes a central area and a peripheral area, and the central area corresponds to the at least one pressure channel. When the rear casing is separated from the front casing, the at least one pressure channel changes from being in a negative pressure state to not being in the negative pressure state. When the at least one pressure channel is in the negative pressure state, the at least one deformable enclosure exhibits a first deformation state, and the first deformation state is that the central area is recessed in a direction toward the second end and does not contact the at least one sensing element. When the at least one pressure channel is not in the negative pressure state, the at least one deformable enclosure exhibits a second deformation state, and the second deformation state is that the central area is flat and contacts the at least one sensing element, so that the security circuit is in a connected state.

The present invention is provided with a pressure channel on the body of the electronic device, and the interior of the pressure channel is in a negative pressure state when the electronic device is in the normal use state, wherein one end of the pressure channel is closed by a deformable enclosure. The destruction in the negative pressure state will cause the deformable enclosure to return from the first deformation state to the second deformation state to promote the deformable enclosure to contact the sensing element, so that the security protection mechanism of the security circuit electrically connected to the sensing element is activated. Therefore, the electronic device of the present invention has a security protection mechanism with a high sensitivity for accessing dada.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
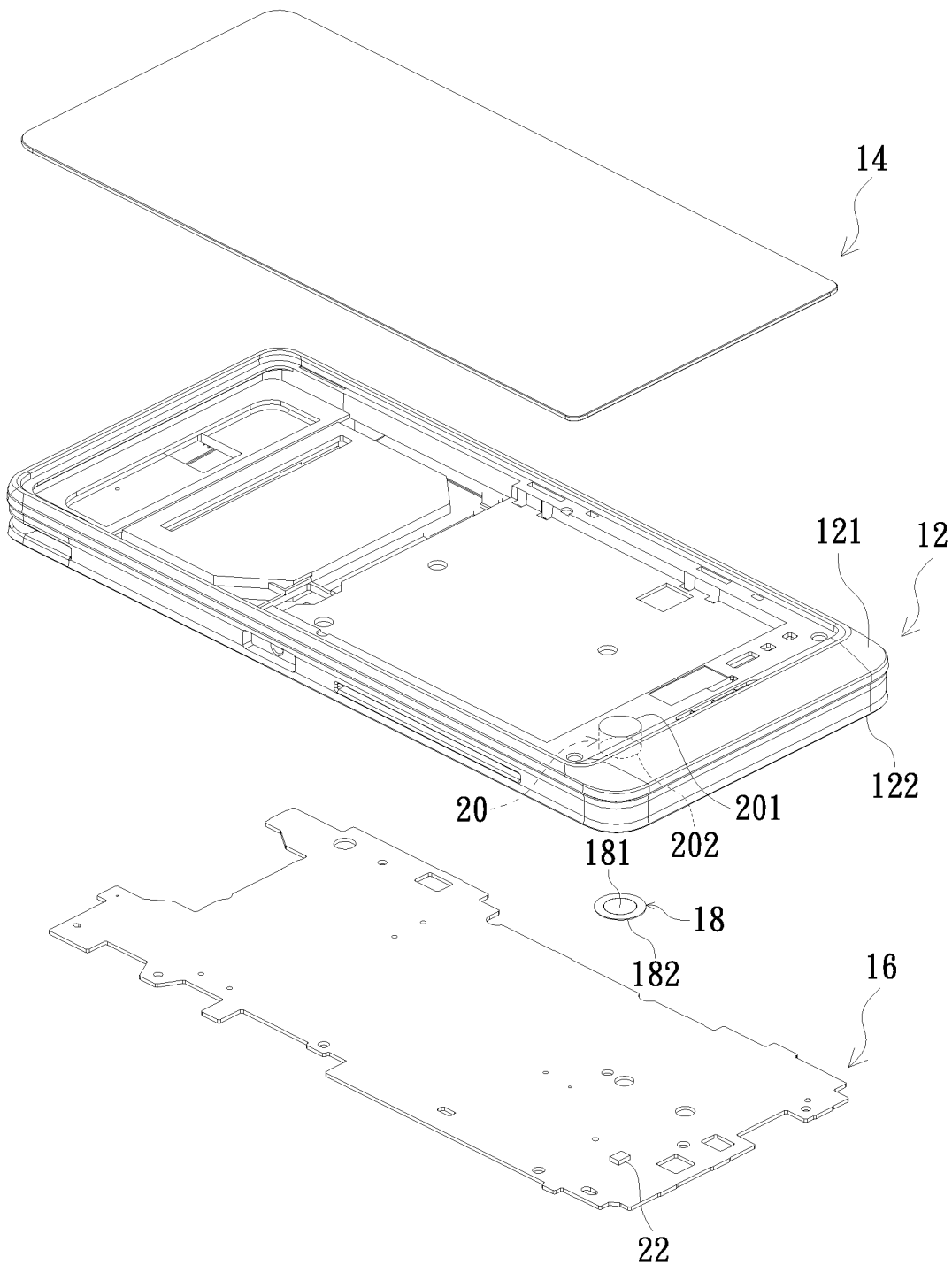
FIG. 1 is a schematic exploded perspective diagram of an electronic device according to a first embodiment of the present invention.
Figure 2:
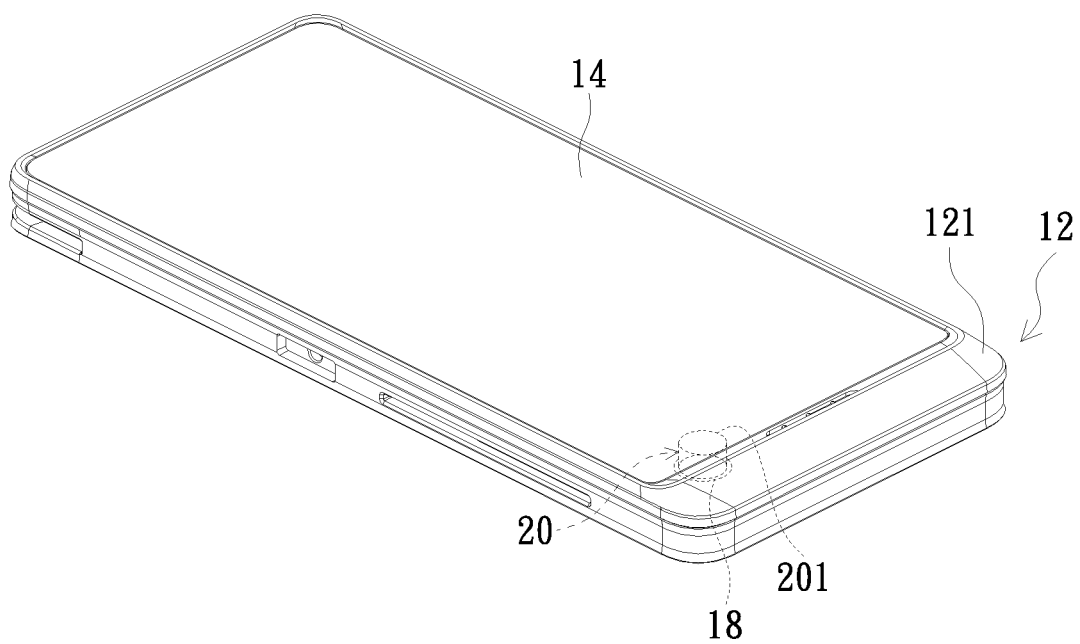
FIG. 2 is a schematic diagram of an appearance the electronic device according to the first embodiment of the present invention.

FIG. 1 is a schematic exploded perspective diagram of an electronic device according to a first embodiment of the present invention. FIG. 2 is a schematic diagram of an appearance the electronic device according to the first embodiment of the present invention. As shown in FIGS. 1 and 2, the electronic device 10 includes a body 12, a detachable element 14, a motherboard 16 and a deformable enclosure 18. The electronic device 10 is, for example, a credit card machine in one embodiment. The body 12 of the electronic device 10 includes a first surface 121 and a second surface 122 opposite to each other. A pressure channel 20 is formed in the body 12. The pressure channel 20 includes a first end 201 and a second end 202. The pressure channel 20 penetrates the first surface 121 or/and the second surface 122.

Continue the above description. The detachable element 14 is arranged on the body 12 and covers the first end 201 of the pressure channel 20. In one embodiment, the detachable element 14 is, for example, a touch panel, which is arranged on the first surface 121 of the body 12 and covers the first end 201 of the pressure channel 20. In addition, the deformable enclosure 18 closes the second end 202 (labeled in FIG. 1) of the pressure channel 20. The deformable enclosure 18 is, for example, a metal sheet. The deformable enclosure 18 includes a central area 181 and a peripheral area 182.

In addition, the motherboard 16 is arranged on the body 12. In one embodiment, the motherboard 16 is arranged on the side of the body 12 away from the detachable element 14 (e.g., a touch panel), and is adjacent to the second end 202 closed by the deformable enclosure 18. A sensing element 22 is arranged on the motherboard 16, and the position of the sensing element 22 corresponds to the position of the pressure channel 20. In one embodiment, the sensing element 22 is, for example, a switching element or a detecting element, wherein the switching element can be a metal element. A security circuit (not shown in the figure) is arranged on the motherboard 16, and the security circuit is electrically connected to the sensing element 22.

Figure 3A:
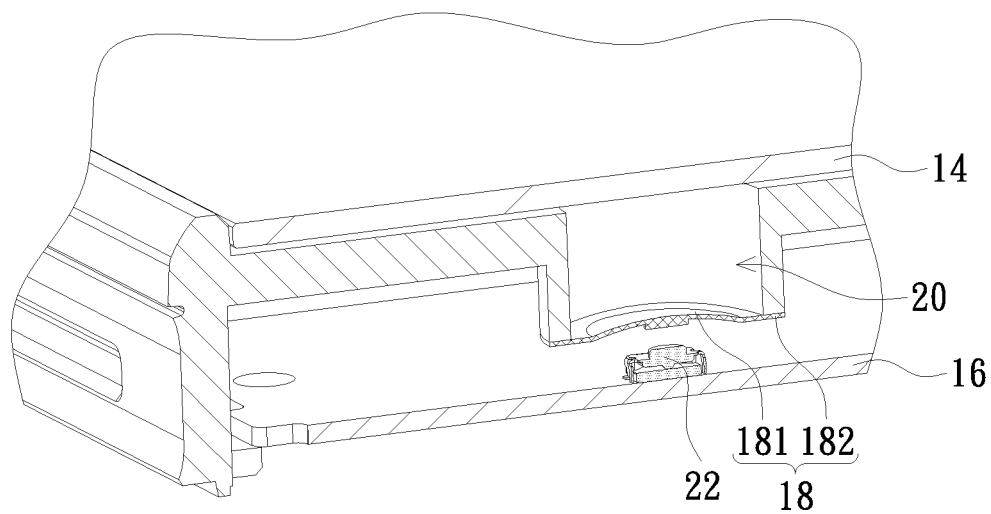
FIG. 3A is a schematic cross-sectional perspective diagram of the electronic device according to the first embodiment of the present invention, in which the pressure channel is in a negative pressure state.
Figure 3B:
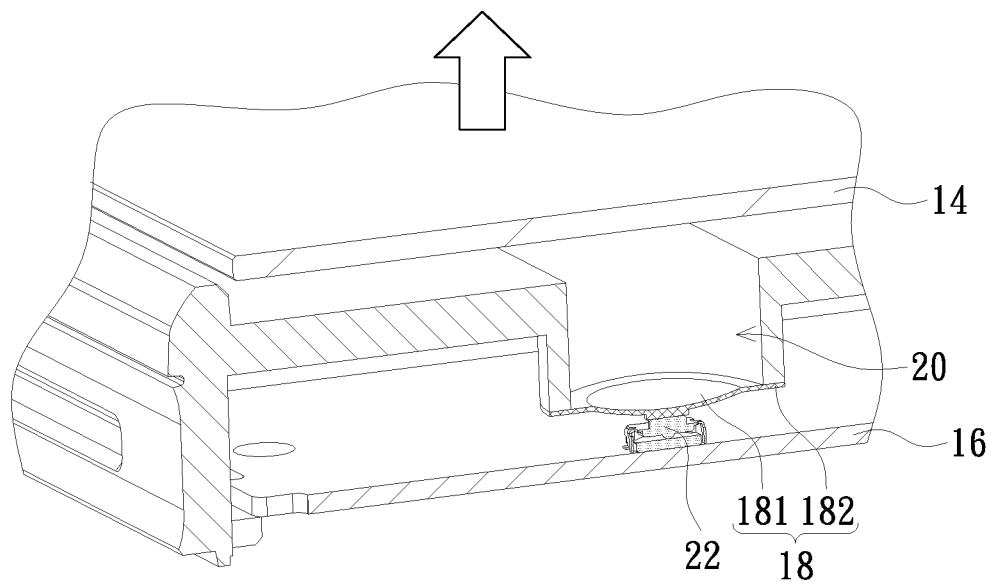
FIG. 3B is another schematic cross-sectional perspective diagram of the electronic device according to the first embodiment of the present invention, in which the pressure channel is not in a negative pressure state.

FIG. 3A is a schematic cross-sectional perspective diagram of the electronic device according to the first embodiment of the present invention, in which the pressure channel is in a negative pressure state. FIG. 3B is another schematic cross-sectional perspective diagram of the electronic device according to the first embodiment of the present invention, in which the pressure channel is not in a negative pressure state. In one embodiment as shown in FIGS. 3A and 3B, the peripheral area 182 of the deformable enclosure 18 is arranged on the peripheral wall of the pressure channel 20, and the central area 181 corresponds to the pressure channel 20. As shown in FIG. 3A, the deformable enclosure 18 exhibits a first deformation state when the pressure channel 20 is in a negative pressure state. In one embodiment, the first deformation state of the deformable enclosure 18 is that the central area 181 is recessed in a direction toward the second end 202 (labeled in FIG. 1), and therefore the central area 181 is away from the sensing element 22 and does not contact the sensing element 22. As shown in FIG. 3B, the deformable enclosure 18 exhibits a second deformation state when the pressure channel 20 is not in a negative pressure state. In one embodiment, the second deformation state of the deformable enclosure 18 is that the central area 181 is not recessed but returns to a flat state and contacts the sensing element 22. In one embodiment, the security circuit is in a connected state as the deformable enclosure 18 contacts the sensing element 22.

In the above-mentioned embodiment, when the electronic device 10 is assembled, the pressure channel 20 can be kept in a negative pressure state and therefore the deformable enclosure 18 is not in contact with the sensing element 22 by closing the first end 201 of the pressure channel 20 with the detachable element 14 (e.g., a touch panel) and closing the second end 202 of the pressure channel 20 with the deformable enclosure 18. However, once someone intends to disassemble the electronic device 10, such as removing the detachable element 14 (e.g., a touch panel), the negative pressure state of the pressure channel 20 is destroyed, which causes the deformable enclosure 18 to return to a flat state and contact the sensing element 22. As a result, the security circuit on the motherboard 16 is connected to immediately destroy the stored information.

Figure 4:
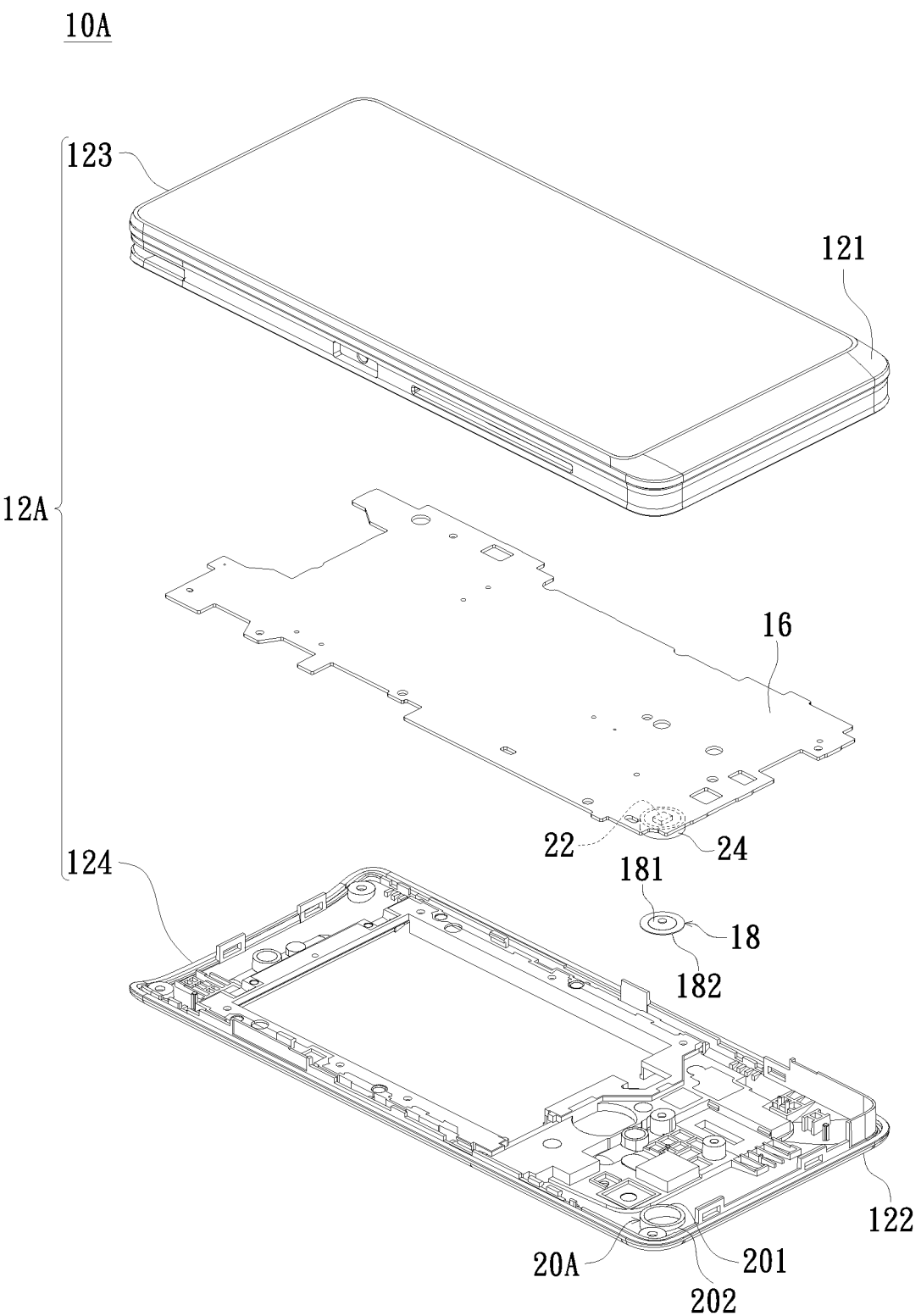
FIG. 4 is a schematic exploded perspective diagram of an electronic device according to a second embodiment of the present invention.
Figure 5:
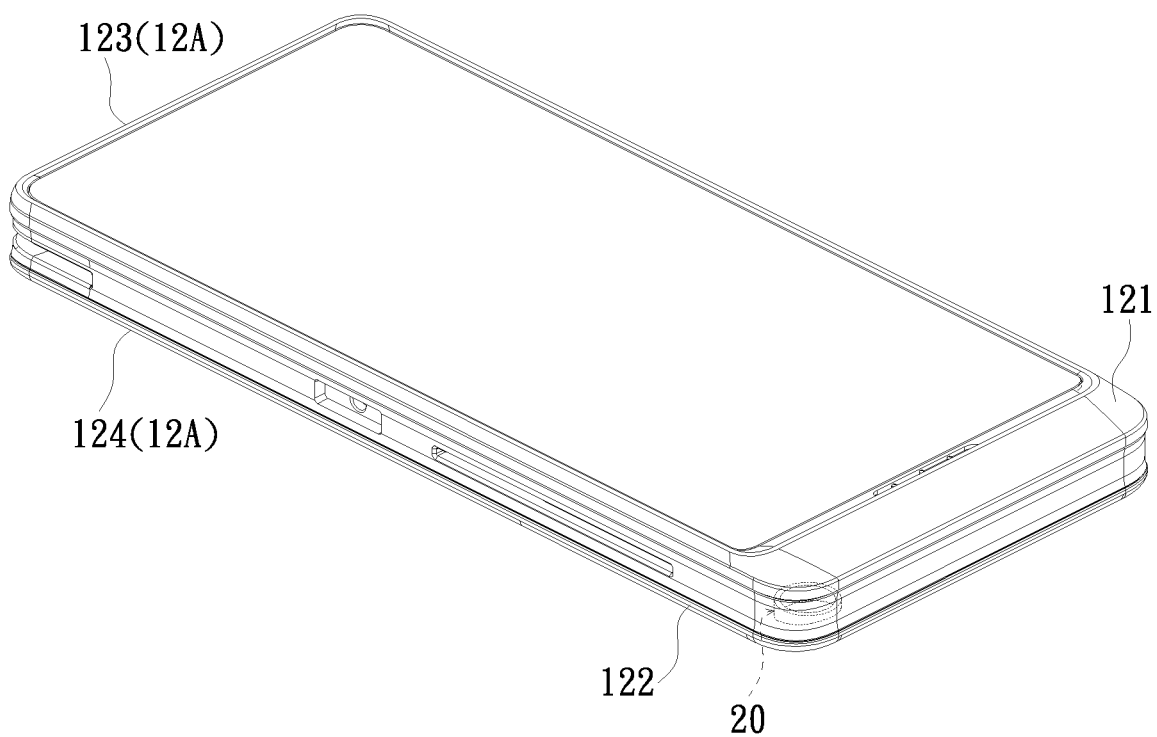
FIG. 5 is a schematic diagram of an appearance the electronic device according to the second embodiment of the present invention.

FIG. 4 is a schematic exploded perspective diagram of an electronic device according to a second embodiment of the present invention. FIG. 5 is a schematic diagram of an appearance the electronic device according to the second embodiment of the present invention. As shown in FIGS. 4 and 5, the electronic device 10A includes a body 12A, a motherboard 16 and a deformable enclosure 18. The body 12A includes a first surface 121 and a second surface 122 opposite to each other. In one embodiment, the body 12A includes a front casing 123 and a rear casing 124. The front casing 123 and the rear casing 124 are suitable for being covered with each other. The first surface 121 is located, for example, on the front casing 123, and the second surface 122 is located, for example, on the rear casing 124. The motherboard 16 is arranged between the front casing 123 and the rear casing 124.

A pressure channel 20A is formed in the body 12A. The pressure channel 20A includes a first end 201 and a second end 202. In one embodiment as shown in FIG. 4, the pressure channel 20A is formed in the rear casing 124, the first end 201 of the pressure channel 20A is adjacent to the second surface 122 but does not penetrate the second surface 122, that is, the first end 201 functions as a closed end, and the second end 202 of the pressure channel 20A is adjacent to the motherboard 16. As shown in FIG. 4, a sensing element 22 and a supporting member 24 are arranged on the motherboard 16. The supporting member 24 is, for example, annular and is arranged around the periphery of the sensing element 22. The position of the sensing element 22 corresponds to the position of the pressure channel 20A.

Figure 6A:
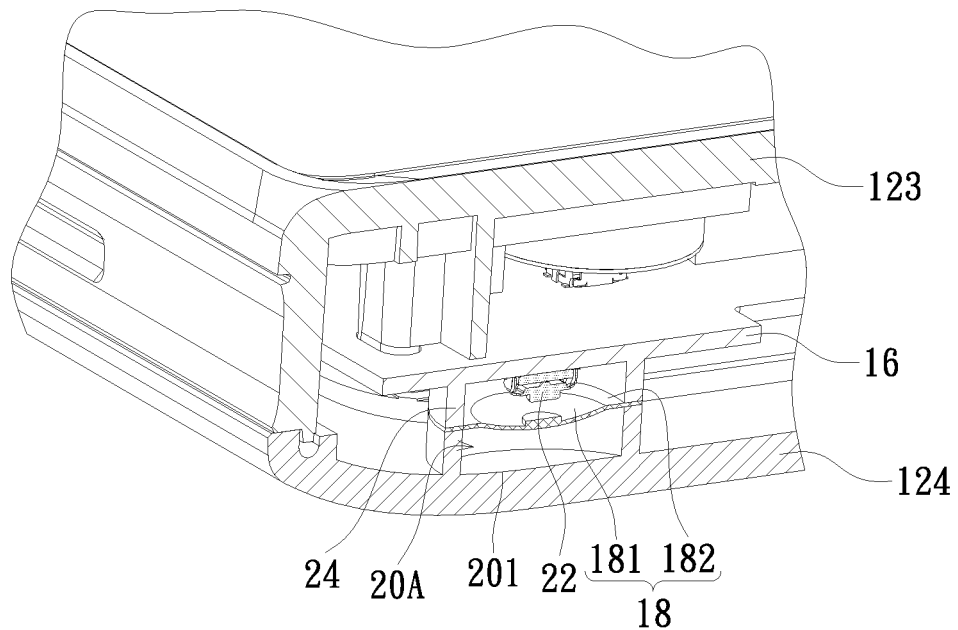
FIG. 6A is a schematic cross-sectional perspective diagram of the electronic device according to the second embodiment of the present invention, in which the pressure channel is in a negative pressure state.
Figure 6B:
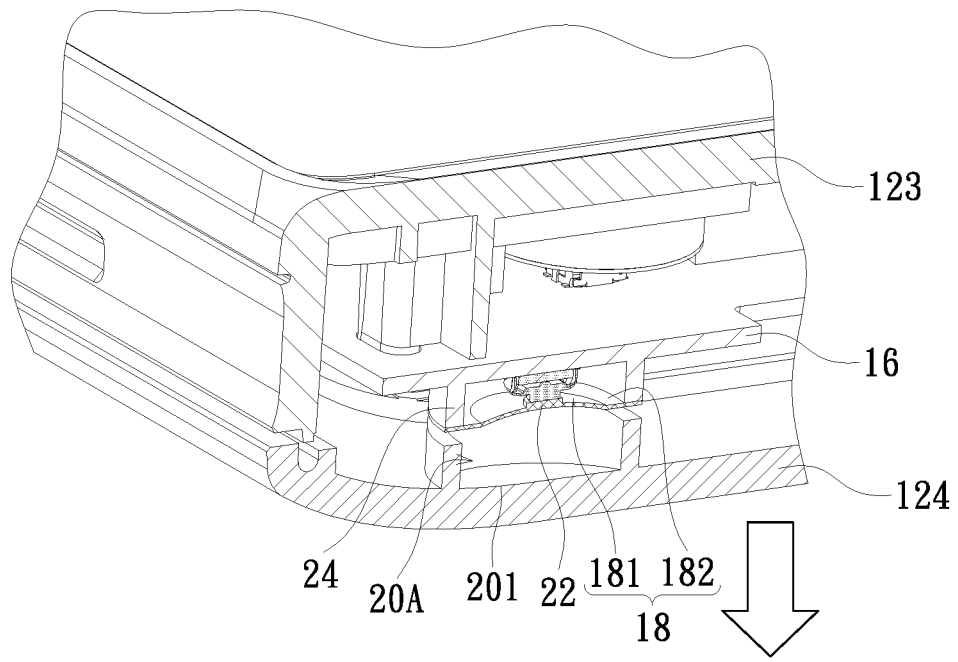
FIG. 6B is another schematic cross-sectional perspective diagram of the electronic device according to the second embodiment of the present invention, in which the pressure channel is not in a negative pressure state.

Continue the above description. FIG. 6A is a schematic cross-sectional perspective diagram of the electronic device according to the second embodiment of the present invention, in which the pressure channel is in a negative pressure state. FIG. 6B is another schematic cross-sectional perspective diagram of the electronic device according to the second embodiment of the present invention, in which the pressure channel is not in a negative pressure state. As shown in FIGS. 6A and 6B, the deformable enclosure 18 closes the second end 202 (labeled in FIG. 4) of the pressure channel 20A. The deformable enclosure 18 is, for example, a metal sheet. The deformable enclosure 18 includes a central area 181 and a peripheral area 182. In one embodiment, the peripheral area 182 is disposed on the supporting member 24 and is sandwiched between the periphery of the pressure channel 20A and the supporting member 24, and the central area 181 corresponds to the pressure channel 20A. As shown in FIG. 6A, the deformable enclosure 18 exhibits a first deformation state when the pressure channel 20A is in a negative pressure state. In one embodiment, the first deformation state of the deformable enclosure 18 is that the central area 181 is recessed in a direction toward the second end 202, and therefore the central area 181 is away from the sensing element 22 and does not contact the sensing element 22. As shown in FIG. 6B, the deformable enclosure 18 exhibits a second deformation state when the pressure channel 20 is not in a negative pressure state due to that the rear casing 124 is separated from the front casing 123. In one embodiment, the second deformation state of the deformable enclosure 18 is that the central area 181 is not recessed but returns to a flat state and contacts the sensing element 22. In one embodiment, the security circuit is in a connected state as the deformable enclosure 18 contacts the sensing element 22.

In the above-mentioned embodiment, when the electronic device 10A is assembled and the first end 201 of the pressure channel 20A functions as a closed end, the pressure channel 20A can be kept in a negative pressure state and therefore the deformable enclosure 18 is not in contact with the sensing element 22 by closing the second end 202 of the pressure channel 20A with the deformable enclosure 18. However, once someone intends to disassemble the electronic device 10A, such as separating the front casing 123 and the rear casing 124, the negative pressure state of the pressure channel 20A is destroyed, which causes the deformable enclosure 18 to return to a flat state and contact the sensing element 22. As a result, the security circuit on the motherboard 16 is connected to immediately destroy the stored information.

According to the above, the present invention is provided with a pressure channel on the body of the electronic device, and the interior of the pressure channel is in a negative pressure state when the electronic device is in the normal use state, wherein one end of the pressure channel is closed by a deformable enclosure. The destruction in the negative pressure state will cause the deformable enclosure to return from the first deformation state to the second deformation state to promote the deformable enclosure to contact the sensing element, so that the security protection mechanism of the security circuit electrically connected to the sensing element is activated. Therefore, the electronic device of the present invention has a security protection mechanism with a high sensitivity for accessing data.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
a body, comprising a first surface and a second surface opposite to each other, wherein the body is formed with at least one pressure channel, the at least one pressure channel comprises a first end and a second end, and the at least one pressure channel penetrates the first surface or the second surface;
a detachable element, covering the first end of the at least one pressure channel;
a motherboard, arranged on the body, wherein at least one sensing element and a security circuit are arranged on the motherboard and the security circuit is electrically connected to the at least one sensing element, wherein the at least one sensing element is a switching element; and at least one deformable enclosure, closing the second end of the at least one pressure channel, wherein when the at least one pressure channel is in a negative pressure state, the deformable enclosure exhibits a first deformation state, and the at least one deformable enclosure does not contact the at least one sensing element, wherein when the at least one pressure channel is not in the negative pressure state, the deformable enclosure exhibits a second deformation state, and the at least one deformable enclosure contacts the at least one sensing element, wherein the destruction in the negative pressure state causes the at least one deformable enclosure to return from the first deformation state to the second deformation state to promote the at least one deformable enclosure to contact the at least one sensing element, so that a security protection mechanism of the security circuit is activated.

2. The electronic device according to claim 1, wherein the deformable enclosure is a metal sheet and comprises a central area and a peripheral area, and the central area corresponds to the at least one pressure channel.

3. The electronic device according to claim 2, wherein the first deformation state of the deformable enclosure is that the central area is recessed in a direction toward the second end so as not to contact the at least one sensing element, and the second deformation state of the deformable enclosure is that the central area is flat and contacts the at least one sensing element.

4. The electronic device according to claim 1, wherein the at least one pressure channel changes from being in the negative pressure state to not being in the negative pressure state when the detachable element is away from the at least one pressure channel.

5. The electronic device according to claim 1, wherein the detachable element is a touch panel.

6. The electronic device according to claim 1, wherein the switching element is a metal element.

7. The electronic device according to claim 1, wherein the security circuit is in a connected state when the at least one deformable enclosure contacts the at least one sensing element.

8. An electronic device, comprising:
a body, comprising a front casing and a rear casing, wherein the front casing and the rear casing are suitable for being covered with each other, the rear casing is formed with at least one pressure channel, the at least one pressure channel comprises a first end and a second end, and the first end of the at least one pressure channel does not penetrate the rear casing and functions as a closed end;
a motherboard, arranged between the front casing and the rear casing, wherein at least one sensing element, a security circuit and at least one supporting member are arranged on the motherboard, the at least one supporting member surrounds the at least one sensing element, and the security circuit is electrically connected to the at least one sensing element, wherein the at least one sensing element is a switching element; and
at least one deformable enclosure, fixed between the at least one supporting member and the at least one pressure channel, wherein the at least one deformable enclosure closes the second end of the at least one pressure channel, wherein when the at least one pressure channel is in a negative pressure state, the at least one deformable enclosure exhibits a first deformation state, and the at least one deformable enclosure does not contact the at least one sensing element, wherein when the at least one pressure channel is not in the negative pressure state, the at least one deformable enclosure exhibits a second deformation state, and the at least one deformable enclosure contacts the at least one sensing element, wherein the destruction in the negative pressure state causes the at least one deformable enclosure to return from the first deformation state to the second deformation state to promote the at least one deformable enclosure to contact the at least one sensing element, so that a security protection mechanism of the security circuit is activated.

9. The electronic device according to claim 8, wherein the deformable enclosure is a metal sheet and comprises a central area and a peripheral area, the peripheral area is fixed to the at least one supporting member, and the central area corresponds to the at least one pressure channel.

10. The electronic device according to claim 9, wherein the first deformation state of the deformable enclosure is that the central area is recessed in a direction toward the second end so as not to contact the at least one sensing element, and the second deformation state of the deformable enclosure is that the central area is flat and contacts the at least one sensing element.

11. The electronic device according to claim 8, wherein when the rear casing is separated from the front casing, the at least one pressure channel changes from being in the negative pressure state to not being in the negative pressure state.

12. The electronic device according to claim 8, wherein the switching element is a metal element.

13. The electronic device according to claim 8, wherein the security circuit is in a connected state when the at least one deformable enclosure contacts the at least one sensing element.

14. An electronic device, comprising:
a body, comprising a front casing and a rear casing, wherein the front casing and the rear casing are suitable for being covered with each other, the rear casing is formed with at least one pressure channel, the at least one pressure channel comprises a first end and a second end, and the first end of the at least one pressure channel does not penetrate the rear casing and functions as a closed end;
a motherboard, arranged between the front casing and the rear casing, wherein at least one sensing element, a security circuit and at least one supporting member are arranged on the motherboard, the at least one supporting member surrounds the at least one sensing element, and the security circuit is electrically connected to the at least one sensing element; and
at least one deformable enclosure, fixed between the at least one supporting member and the at least one pressure channel, wherein the at least one deformable enclosure closes the second end of the at least one pressure channel, the at least one deformable enclosure comprises a central area and a peripheral area, and the central area corresponds to the at least one pressure channel, wherein when the rear casing is separated from the front casing, the at least one pressure channel changes from being in a negative pressure state to not being in the negative pressure state, wherein when the at least one pressure channel is in the negative pressure state, the at least one deformable enclosure exhibits a first deformation state, and the first deformation state is that the central area is recessed in a direction toward the second end and does not contact the at least one sensing element, wherein when the at least one pressure channel is not in the negative pressure state, the at least one deformable enclosure exhibits a second deformation state, and the second deformation state is that the central area is flat and contacts the at least one sensing element, so that the security circuit is in a connected state and a security protection mechanism of the security circuit is activated.

* * * * *